(12) United States Patent
Wentworth

(10) Patent No.: US 7,128,499 B2
(45) Date of Patent: Oct. 31, 2006

(54) METHOD FOR EXTRACTING UNDERGROUND PIPE

(75) Inventor: Steven W. Wentworth, Brookfield, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 0 days.

(21) Appl. No.: 11/117,655

(22) Filed: Apr. 28, 2005

(65) Prior Publication Data
US 2006/0099035 A1    May 11, 2006

Related U.S. Application Data

(60) Provisional application No. 60/565,919, filed on Apr. 28, 2004.

(51) Int. Cl.
*F16L 55/18* (2006.01)
(52) U.S. Cl. ...................... 405/184.1; 138/97
(58) Field of Classification Search .. 405/184.1–184.4; 138/97
See application file for complete search history.

(56) References Cited

U.S. PATENT DOCUMENTS

| | | | | |
|---|---|---|---|---|
| 4,637,756 A | * | 1/1987 | Boles | 405/184.1 |
| 5,439,320 A | * | 8/1995 | Abrams | 405/184.3 |
| 6,171,026 B1 | | 1/2001 | Crane et al. | 405/156 |
| 6,655,874 B1 | | 12/2003 | Crane et al. | 405/184.3 |
| 6,793,442 B1 | * | 9/2004 | Carter et al. | 405/184.3 |
| 6,854,932 B1 | * | 2/2005 | Putnam | 405/184.3 |
| 7,025,536 B1 | * | 4/2006 | Putnam | 405/184.3 |
| 7,032,429 B1 | * | 4/2006 | McDougle | 72/453.15 |

OTHER PUBLICATIONS

National Telephone Supply Company, "Manufacturers of Genuine Nicopress products," www.nicopress.com, Apr. 11, 2005, 2 pages.

* cited by examiner

*Primary Examiner*—Frederick L. Lagman
(74) *Attorney, Agent, or Firm*—Philip G. Meyers

(57) ABSTRACT

A method for the removal of a ductile pipe includes passing a strand through the ductile pipe, crimping the ductile pipe in at least one location so that it is secured in a crimp about the strand and pulling the strand from an end of the ductile pipe with a winch or hydraulic puller. Preferably, the strand is a solid wire or wire rope and may be pushed through the pipe with a power wire feeding apparatus. As the strand and ductile pipe are pulled, segments of the pipe and strand are cut at the end of the pipe proximate the winch or puller.

25 Claims, 16 Drawing Sheets

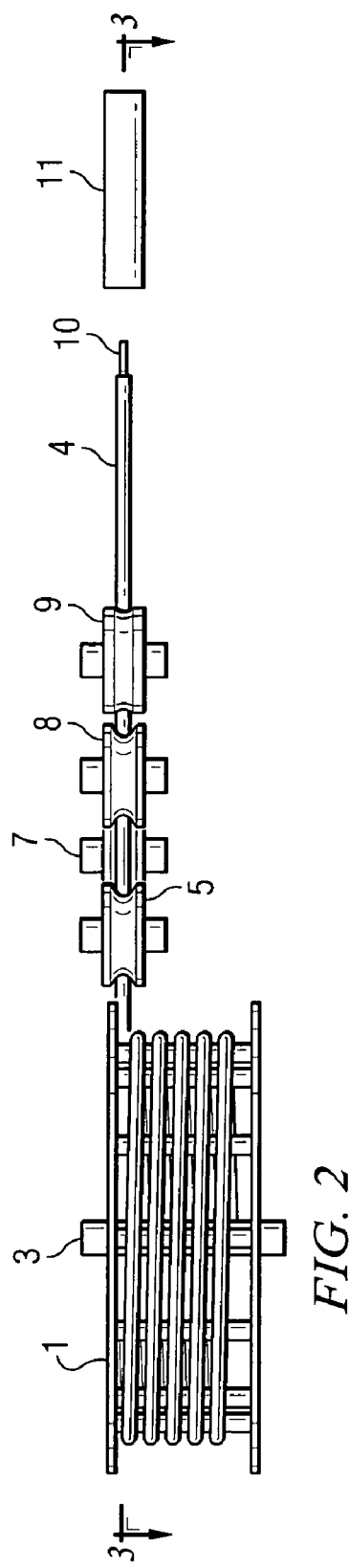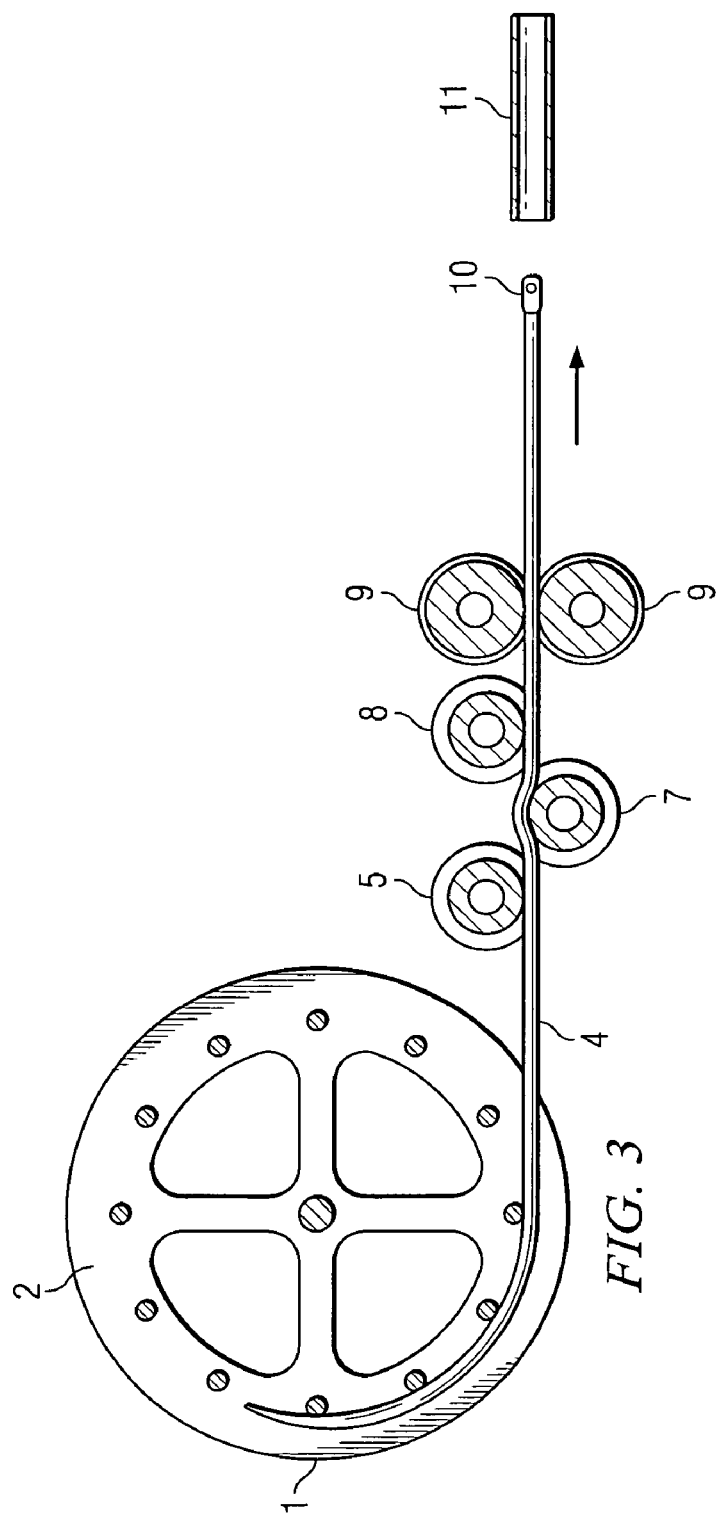

METHOD FOR EXTRACTING UNDERGROUND PIPE

This application claims priority of U.S. Provisional Application No. 60/565,919, filed Apr. 28, 2004.

TECHNICAL FIELD

The invention relates to repair and replacement of underground pipes and conduits and in particular to a method of extracting buried pipe.

BACKGROUND OF THE INVENTION

Over a million miles of small diameter, e.g. less than 1.25" nominal (1.66" OD), underground transmission pipe exists in North America at this time. All of this pipe is aging, and in many cases the aging process results in increased transmission pressure losses along with degradation of the ductile properties of the pipe, necessitating replacement of the pipe. Methods for replacing easily slit plastic and copper piping are disclosed in Crane et al. U.S. Pat. No. 6,171,026, issued Jan. 9, 2001 for a "Method and Apparatus for Replacement of Pipelines, and Crane et al. U.S. Pat. No. 6,655,874, issued Dec. 2, 2003 for a "Method and Apparatus for Slitting Flexible Pipe in an Underground Bore."

Unfortunately, not all of the million plus miles of aging small diameter transmission pipe is easily slit copper or plastic. Many of the underground lines are lead or steel pipe. Although lead and steel can be slit, the use of conventional slitting techniques is limited in the case of small diameter pipes because the force required to slit the pipe is high and the column strength of the pipe, especially lead pipe, is low. As used herein, "small diameter" refers to pipes having an outside diameter of less than 1.66 inches, while the term "column strength" refers to the resistance of a structure to collapse when compressive force is applied. The method described in the above-referenced U.S. Pat. No. 6,655,874 deals with the lack of column strength of underground pipe during the slitting operation by allowing induced tensile stress to be a balancing force that holds the pipe in place while the pipe is slit from the inside.

In some cases it is desirable to extract the old pipe during the replacement operation. The method disclosed in the above-referenced U.S. Pat. No. 6,171,026 demonstrates removal of the pipe with simultaneous installation of a new product pipe. However, a need remains for a method effective for slitting and replacement of lead or steel underground pipes.

SUMMARY OF THE INVENTION

A method for the removal of a ductile pipe includes passing a strand through the ductile pipe, crimping the ductile pipe in at least one location so that it is secured in a crimp about the strand, and pulling the strand from an end of the ductile pipe with a pulling machine such as a winch or hydraulic puller. Preferably, the strand is a solid wire or wire rope and is fed through the pipe using a powered reel or by hand. As the strand and ductile pipe are pulled, segments of the pipe and strand may be cut at the end of the pipe proximate the winch or puller, or otherwise disposed of, such as by winding onto a reel. In one variation, a retaining collar or clamp is secured around the outside of the pipe at the location of the crimp prior to the step of pulling the pipe from the ground.

In the case of longer pipe runs, for example exceeding 75 feet, it is preferable to crimp the pipe onto the strand at multiple locations with at least one crimp being formed at or near the end of the ductile pipe remote from the pulling machine, i.e., winch or hydraulic puller. A replacement pipe can be pulled in behind the ductile pipe. The method is particularly adapted to removal and replacement of ductile, small diameter underground pipe formed from HDPE, copper or steel.

According to a further embodiment of the invention, a method for the removal of a ductile pipe includes the steps of:

(a) passing a strand through the ductile pipe;
(b) crimping the ductile pipe to the strand at its proximal end to form a crimp;
(c) securing the ductile pipe to the strand at at least one location along the length of the pipe spaced from the crimp;
(d) grasping the crimp with a pulling machine; and
(e) then pulling the pipe and strand by the crimp with the pulling machine.

As explained further below, steps (b), (d) and (e) can be performed separately or as part of a single continuous motion in which the jaws of the pulling machine engage the pipe, crimp it to the strand, and then the vise assembly is moved along the frame of the pulling machine.

The invention further provides a strand pulling machine useful in such a method. Such a machine includes a frame provided with a track, a vise movable along the frame including a pair of jaws configured to engage a ductile pipe having a strand extending therethrough and crimp the pipe to the strand, a power cylinder connected to the frame and the vise for moving the vise along the track between frontward and rearward positions, and a cutter disposed proximate a rear end of the frame having a pair of cutting jaws positioned to sever the pipe and strand upon actuation of the cutter. The term "power cylinder" refers to a fluid powered device by which a piston rod is extended or retracted from a cylindrical housing. These and other aspects of the invention are discussed further in the detailed description that follows.

BRIEF DESCRIPTION OF THE DRAWINGS

The method of the present invention is further described and explained in relation to the following figures, wherein like reference numerals are used to indicate like parts in all figures, and wherein:

FIG. 2 is top view of the apparatus of FIG. 1;

FIG. 3 is a partial lengthwise sectional view of the apparatus of FIG. 1;

DETAILED DESCRIPTION

In one method according to the invention, a strand comprising a wire rope, solid steel wire or similar continuous strand of material is passed through the bore of an existing pipe to be replaced. Preferably, the tensile strength of the strand is within the range of readily available, easily handled materials, insofar as extremely high strength materials may be cost prohibitive and present handling problems. For example a cold drawn ⅜" (0.375") 1045 medium carbon steel wire on a 300 foot roll would weigh 112 lb, have a tensile strength of 91,000 psi and a calculated breaking strength of 10,050 lb. The wire is relatively easy to uncoil and straighten when fed from a reel through a small three roll straightening device. As the wire is straightened, it can be inserted into the length of the existing pipe.

Figure 1:
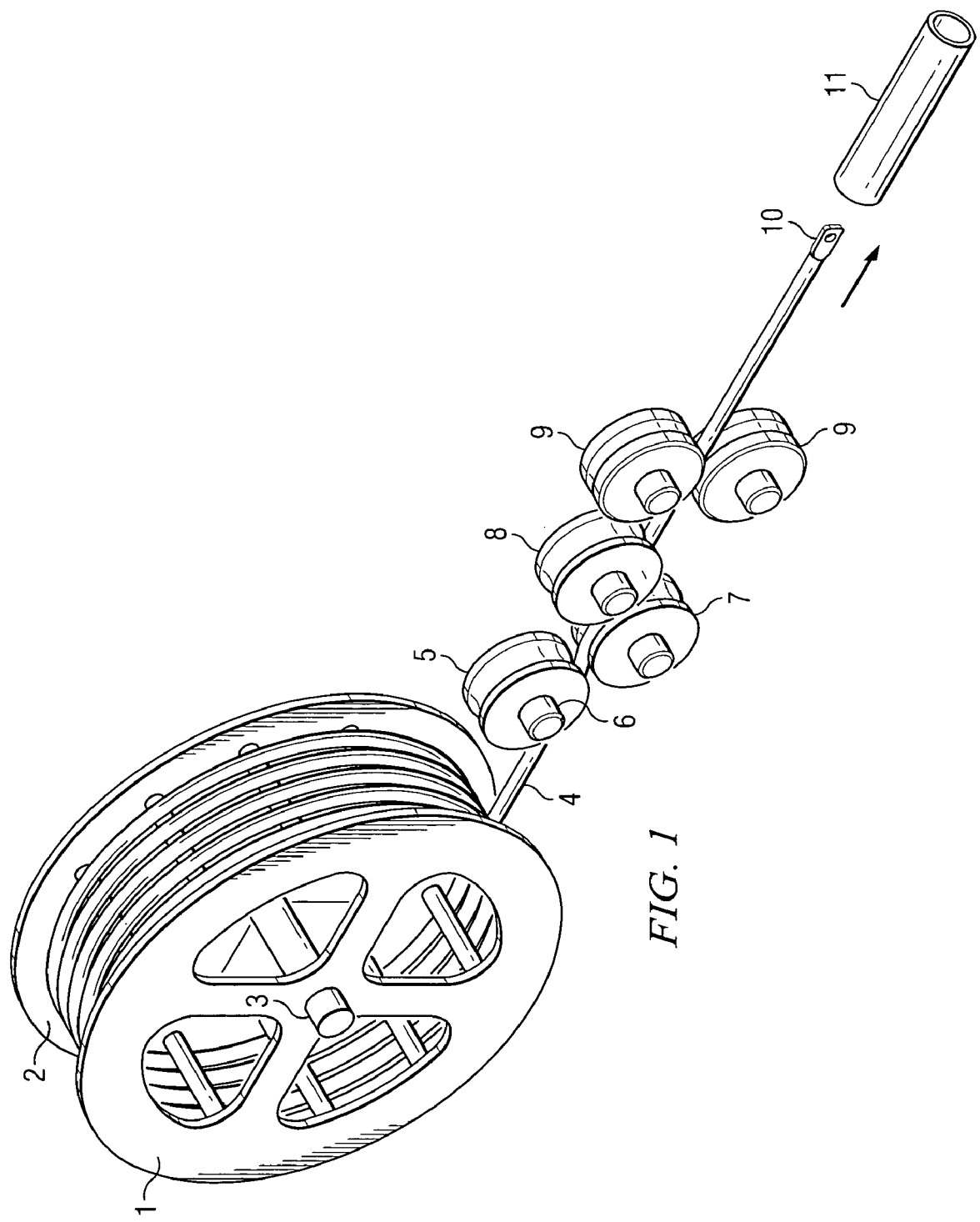
FIG. 1 is a perspective view of a strand feeding apparatus suitable for use in connection with a method of the invention.
Figure 4:
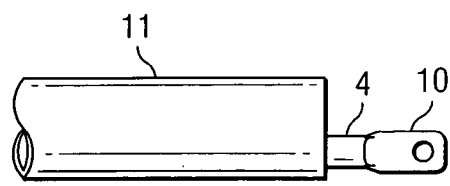
FIG. 4 is a side view of a strand inserted in a pipe in according to a method of the invention.
Figure 5:
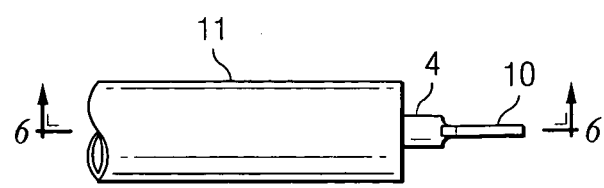
FIG. 5 is a top view of a strand inserted in a pipe in according to a method of the invention.
Figure 6:
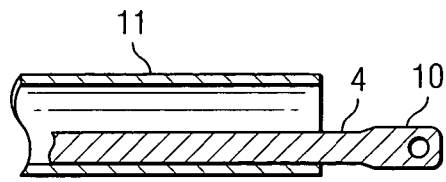
FIG. 6 is a lengthwise sectional view of the strand and pipe of FIG. 4.
Figure 7:
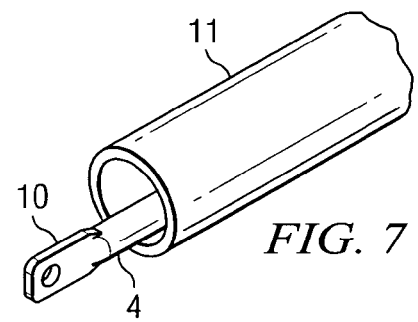
FIG. 7 is a perspective view of the strand and pipe of FIG. 4.
Figure 8:
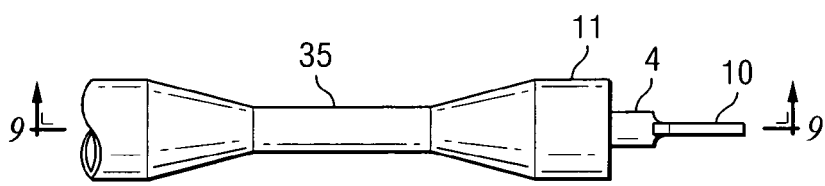
FIG. 8 is a top view of the strand and pipe of FIG. 4 wherein the pipe has been crimped onto the strand according to a method of the invention.

Referring to FIGS. 1–3, a wire feeding apparatus suitable for use in one method according to the invention includes a reel 1 rotatably mounted on axle 3 and having parallel sides 2 for retaining strand 4 on the reel. Supporting framework, drives and bearings have been omitted for clarity. In one variation, strand 4 comprises a continuous length of wire, for example ⅜" diameter cold drawn medium carbon steel wire. As strand 4 is dispensed from reel 1, it passes through sequentially arranged straightening rolls 5, 7 and 8 each of which is mounted on an axle 6. Straightening rolls 5, 7 and 8 are grooved to accept the profile of strand 4. As best shown in FIG. 3, straightening rolls 5, 7 and 8 are configured to form a back bend in strand 4 that relieves or cancels the bend of the strand 4 created when the wire was mounted on reel 1.

After straightening, strand 4 passes through a pair of opposed drive rolls 9. Drive rolls 9 are grooved to conform to the profile of strand 4 and are configured to apply high normal loads to the surface of strand 4. Drive rolls 9 are rotated with a hydraulic motor (not shown) to propel strand 4 into and through a buried pipe 11. Since pipe 11 functions as a sheath and guide for strand 4, drive rolls 9 are capable of pushing strand 4 a significant distance through the pipe.

As an alternative to pushing strand 4 through the pipe to be replaced, the strand can be drawn through pipe 11 with a fiberglass duct rod. In either case, insertion of the described ⅜" diameter wire will leave a pulling strand in place through the length of the existing pipe that has a calculated break strength of 10,050 lb.

Strand 4 is advanced through pipe 11 until the end of the strand protrudes from the exit end of the pipe 11, making eye 10 available as illustrated in FIGS. 4–7. Eye 10 may be used to attach a vary of pipe pullers such as those manufactured and supplied by Earth Tool Co., LLC of Oconomowoc, Wis. 53066 to the end of strand 4. The pipe puller serves as the means to transfer towing force from strand 4 to a product (replacement) pipe, pulling a replacement pipe through the bore as pipe 11 is extracted.

After strand 4 has been extended through pipe 11, a crimping or crushing tool is placed over the pipe to crimp the pipe onto strand 4. The tool is actuated and pipe 11 is collapsed and squeezed onto the strand as shown in FIGS. 8–11. This method of crimping or swaging a tubular sleeve onto a hose or fitting to get mechanical lock is well known within the hydraulic industry as well as the wire rope or rigging industry. Depending upon the length of the pipe section to be extracted, the diameter of the pipe, soil conditions and other factors, it may be desirable to crimp pipe 11 onto strand 4 at one or more locations adjacent the distal end of pipe 11 to insure that pipe 11 is securely attached to strand 4. It may also be desirable to crimp pipe 11 onto strand 4 at intermediate locations.

Figure 9:
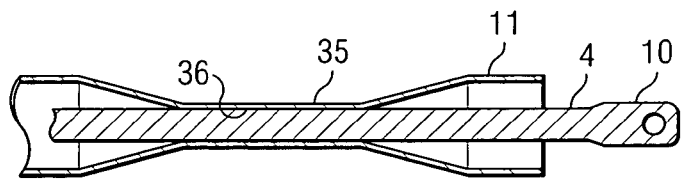
FIG. 9 is a lengthwise sectional view of the strand and pipe of FIG. 8.
Figure 10:
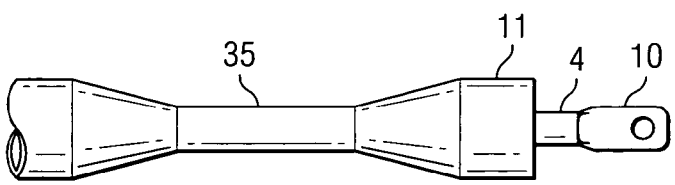
FIG. 10 is a side view of the strand and pipe of FIG. 8.
Figure 11:
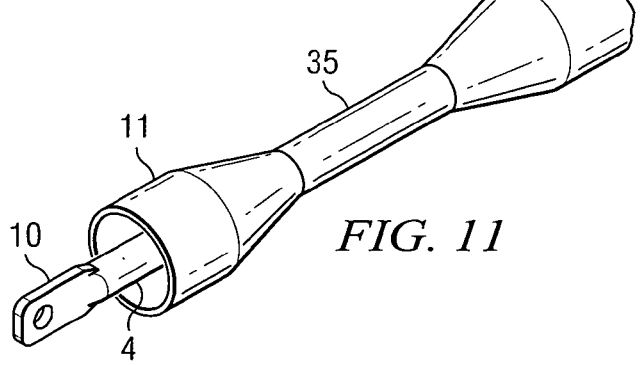
FIG. 11 is a perspective view of the strand and pipe of FIG. 8.

As best shown in FIG. 9, the cross section of swaged area 35 of pipe 11 after crimping can be seen to have a cylindrical area 36 of contact with strand 4. The cylindrical contact area 36 will produce substantial gripping forces between pipe 11 and strand 4 such that towing forces may be applied. If pipe 11 is made of a low strength material such as HDPE plastic, area 35 would additionally have a ferrule or collar made of aluminum or steel applied to pipe 11 to maintain the required contact stresses.

In many cases, the pipeline to be replaced will have one or more lateral connections. For example, a typical 300' run of water service line may have up to ten lateral connections which require excavation when the existing pipe is replaced. Regardless of the method used to replace the existing pipe, these lateral connections must be disconnected and subsequently replaced. Thus, in the practice of the invention, in those instances where pipe 11 has lateral connections, it is desirable to excavate the connections prior to removing pipe 11, disconnect the lateral connections, and then crimp pipe 11 onto strand 4. In this manner, pipe 11 is crimped onto strand 4 at multiple locations at each lateral access pit and at the distal end of pipe 11. Crimping pipe 11 onto strand 4 at multiple locations creates a composite structure with greatly enhanced tensile capabilities in that the strength of pipe 11 is superimposed onto that of strand 4. After pipe 11 has been crimped onto strand 4 at one or more locations, pipe 11 and strand 4 are attached to a puller such as a winch or hydraulic puller for removal.

The composite structure formed when pipe 11 is crimped onto strand 4 can withstand considerable pulling force. Further, since small diameter pipes have relatively little surface area the axial force required to move the pipe in the bore is modest. For example, typical pipe slitting devices used to cut small diameter water lines are pulled through the pipe with a ⅜" wire rope are rated for 14,400 lbs. When slitting such lines, it is not uncommon for the slitter to encounter an obstruction such as a coupler or repair joint and, instead of slitting the pipe, pull the pipe from the ground.

One puller suitable for extracting the composite structure formed by pipe 11 and strand 4 is a hydraulically actuated, cyclic puller, capable of exerting, for example, 16,000 lb or more of force along the axis of the structure. Such hydraulic pullers operate in cycles, pulling a cable a discreet distance set by the travel of the hydraulic cylinders, for example 18 inches per cycle. Optionally, at the end of one or more pulling cycles, the section of pipe 11 extending beyond the rear end of the pulling machine would be cut. Preferably, pipe 11 is cut by shearing the pipe. Shearing of steel, even moderately high strength steel, is routinely done in steel fabrication shops and on construction sites where the rebar used in concrete structures must be shortened prior to welding.

The shear cutter may be located adjacent to the pulling device or may be integral to the jaws of the pulling device, cutting the exposed end of the strand and pipe at the time of crimping. With actuation at the end of every cycle, an 18" section of pipe 11 and strand 4 would be removed, making it convenient to deposit in a bin. The discard, made up of steel or lead with a steel core would have scrap value at a salvage yard.

When the distal end of the coax structure reaches the pulling machine, the old host pipe will have been extracted from the ground. Additionally, the new product pipe or pipes or pipe and cable(s) coupled to the composite structure formed by pipe 11 and strand 4 will have traversed the bore previously occupied by the host pipe. Lateral connections may then be re-established or the same process described above may be used to replace the lateral lines extending from the main line. In this manner the entire buried local transmission pipe system may be rehabilitated.

Figure 12:
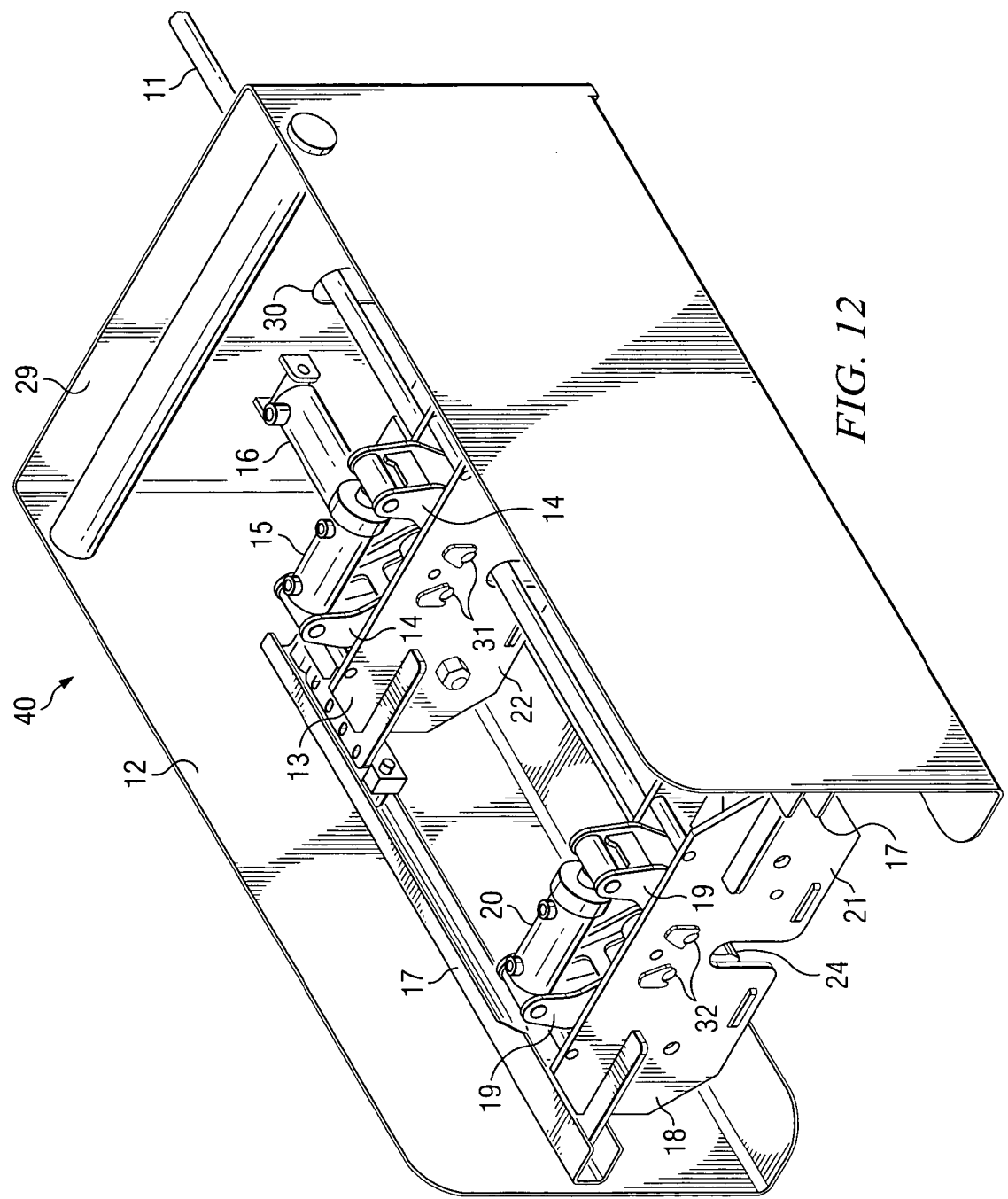
FIG. 12 is a perspective view of a strand pulling and shearing apparatus suitable for use in the practice of the invention, with the pulling and shear jaws in the open position.
Figure 13:
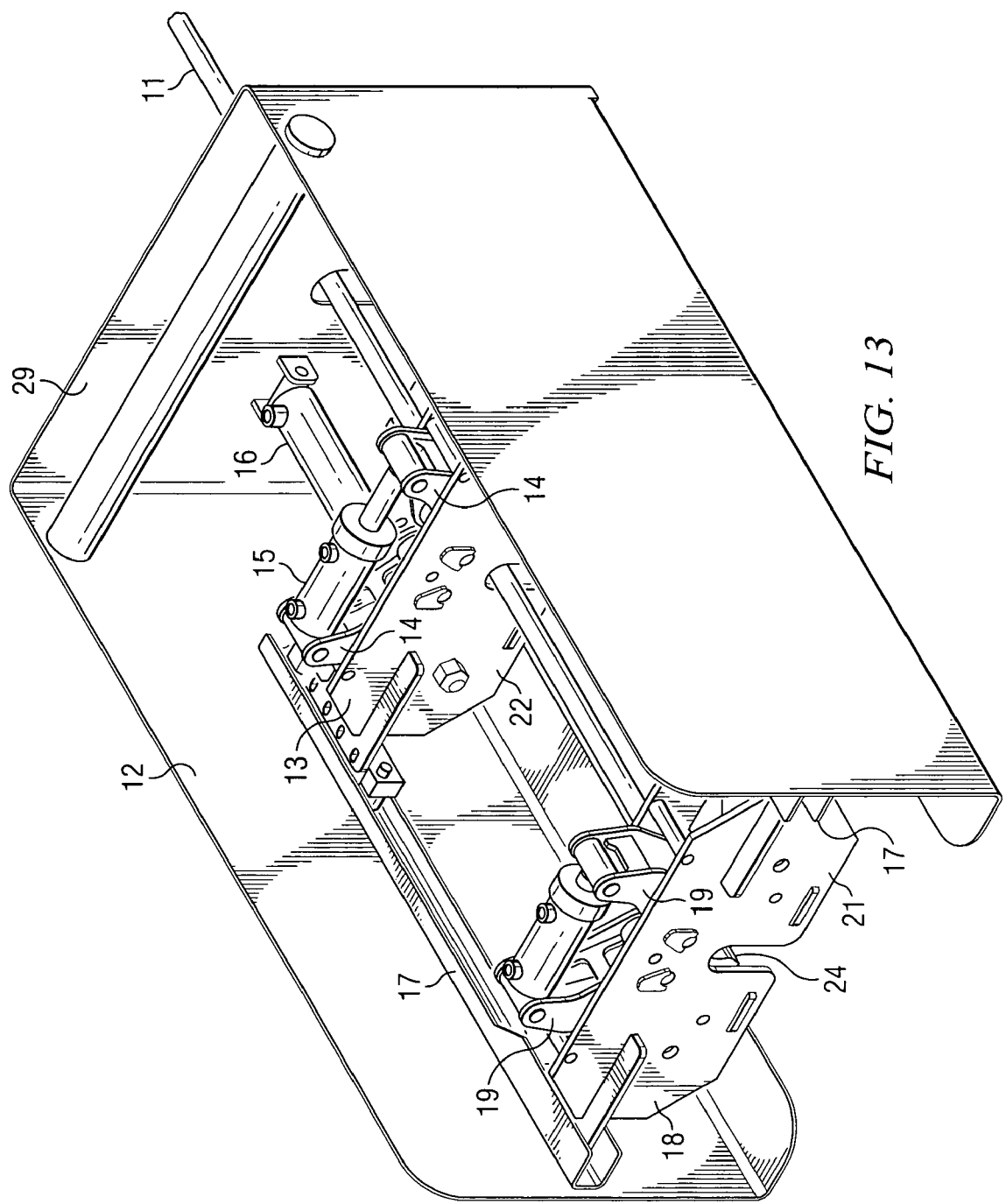
FIG. 13 is a perspective view of the strand pulling and shearing apparatus of FIG. 12 with the pulling jaws in the closed position.

Referring to FIGS. 12–22, a combination strand pulling and shearing apparatus 40 suitable for use in the practice of the invention is illustrated. As illustrated in FIG. 12, apparatus 40 includes a frame 12 with a front shoring face 29 with a vertical slot 30. Slot 30 allows apparatus 40 to be placed over strand 4 with pipe 11 positioned in the slot. Pulling and shearing apparatus 40 further includes a movable vise assembly 13 mounted on a set of wheels 27 (FIG. 17) that run on parallel tracks 17 on the inside of frame 12 such that the vise assembly is moveable within frame 12.

Figure 16:
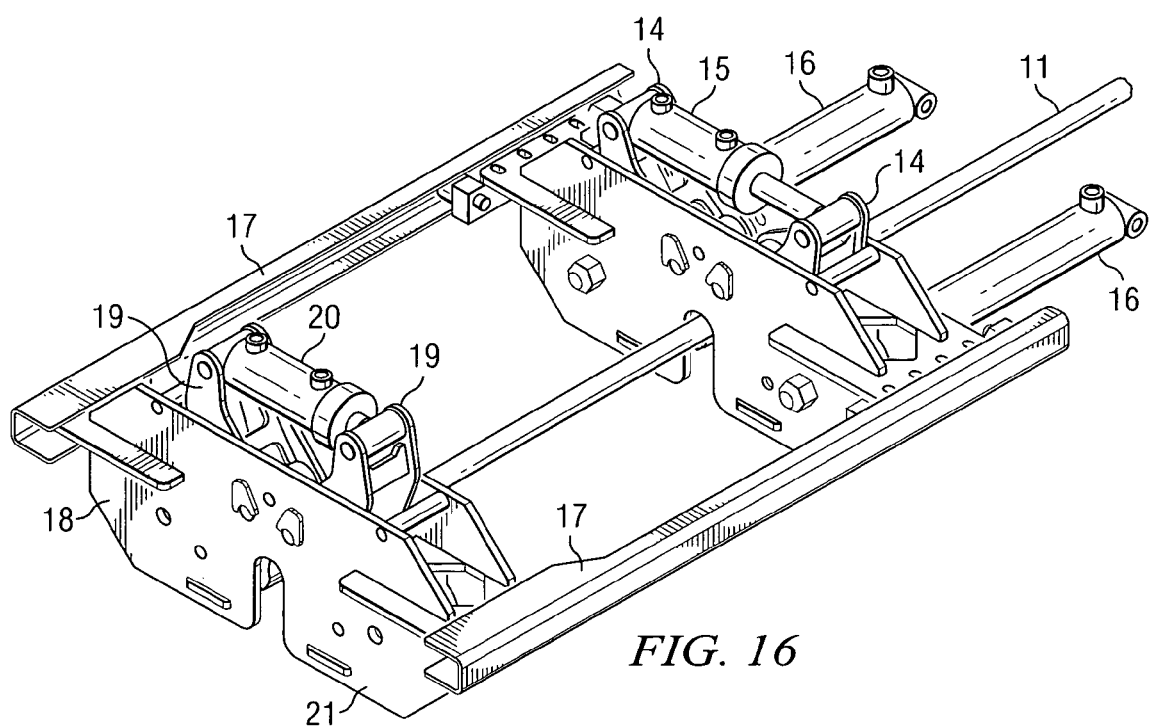
FIG. 16 is a partial perspective view of the strand pulling and shearing apparatus of FIG. 15 wherein the shear jaws have been opened and the pulling vise moved to a forward position.
Figure 17:
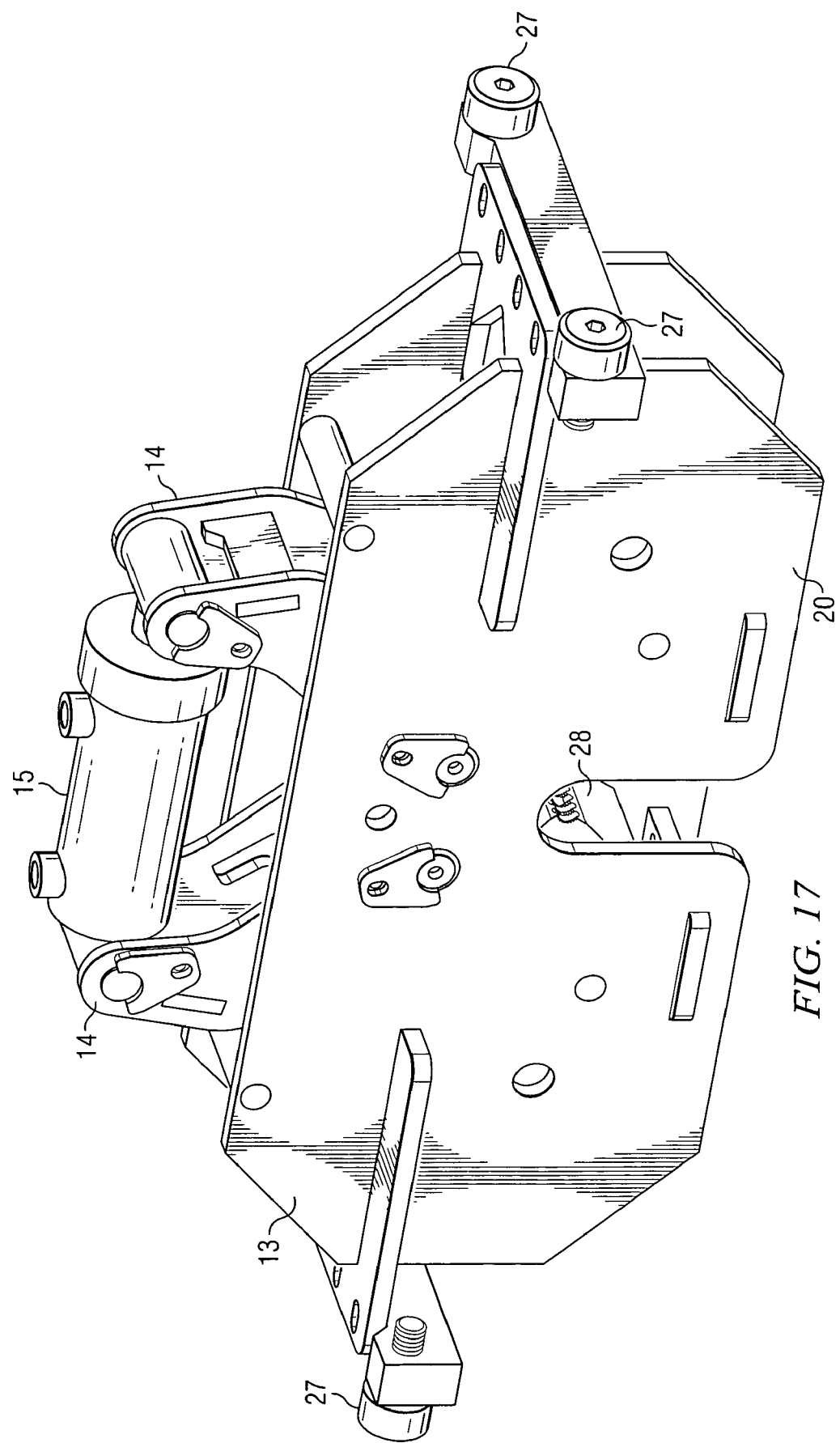
FIG. 17 is a rear perspective view of the vise assembly of the strand pulling and shearing apparatus of FIGS. 12–16.
Figure 18:
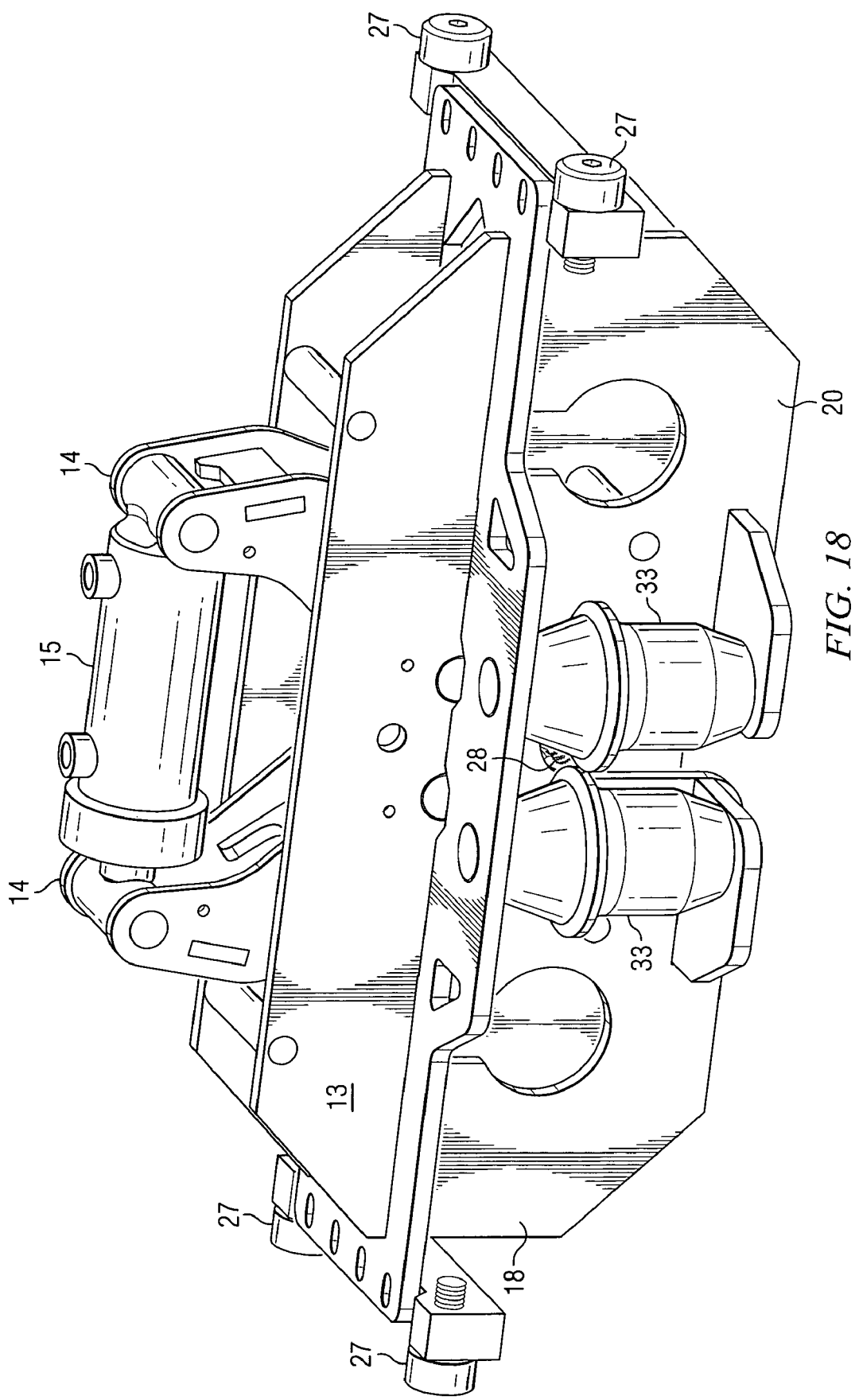
FIG. 18 is a front perspective view of the vise assembly of FIG. 17.
Figure 19:
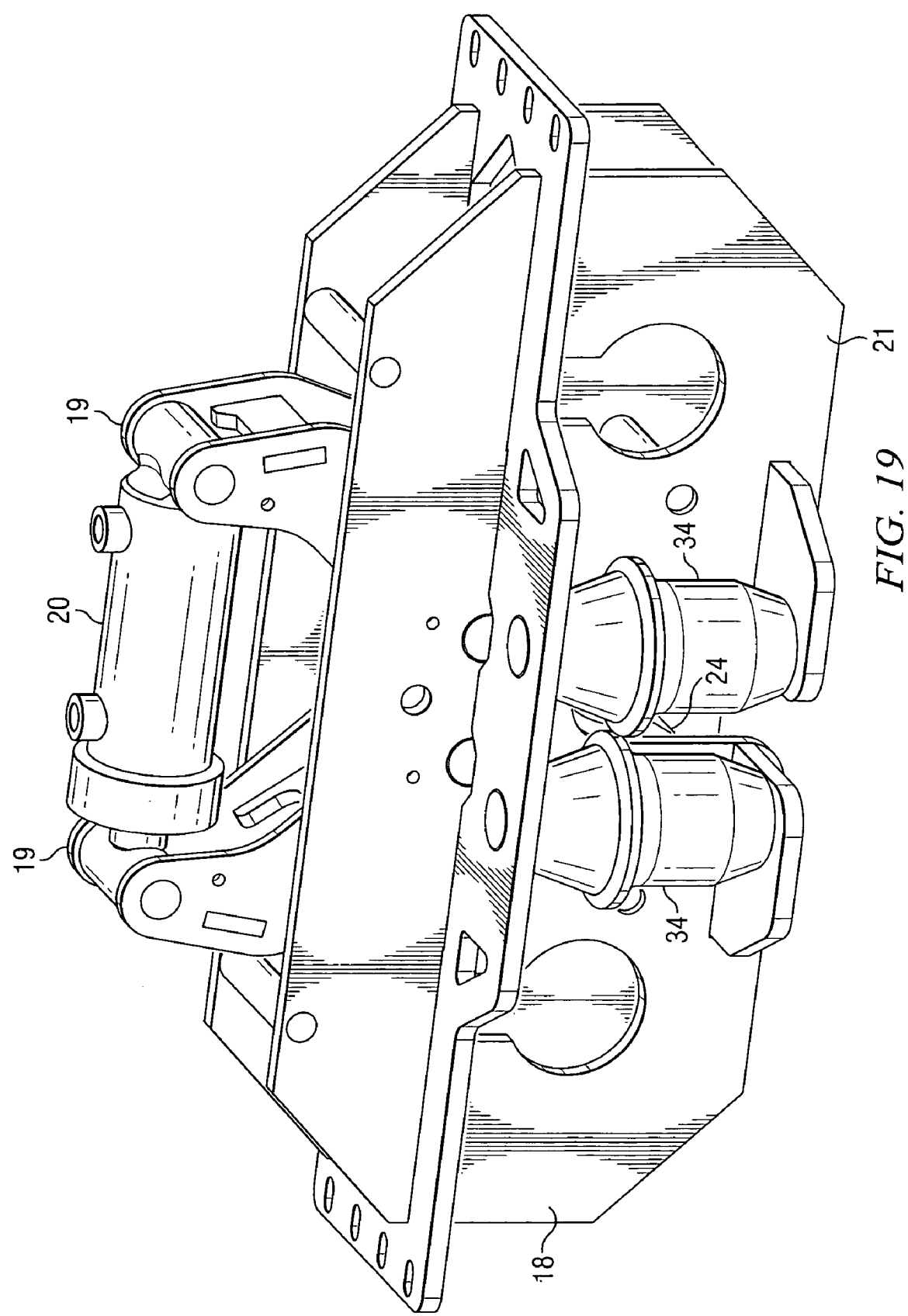
FIG. 19 is a front perspective view of the shear assembly of the strand pulling and shearing apparatus of FIGS. 12–16.
Figure 20:
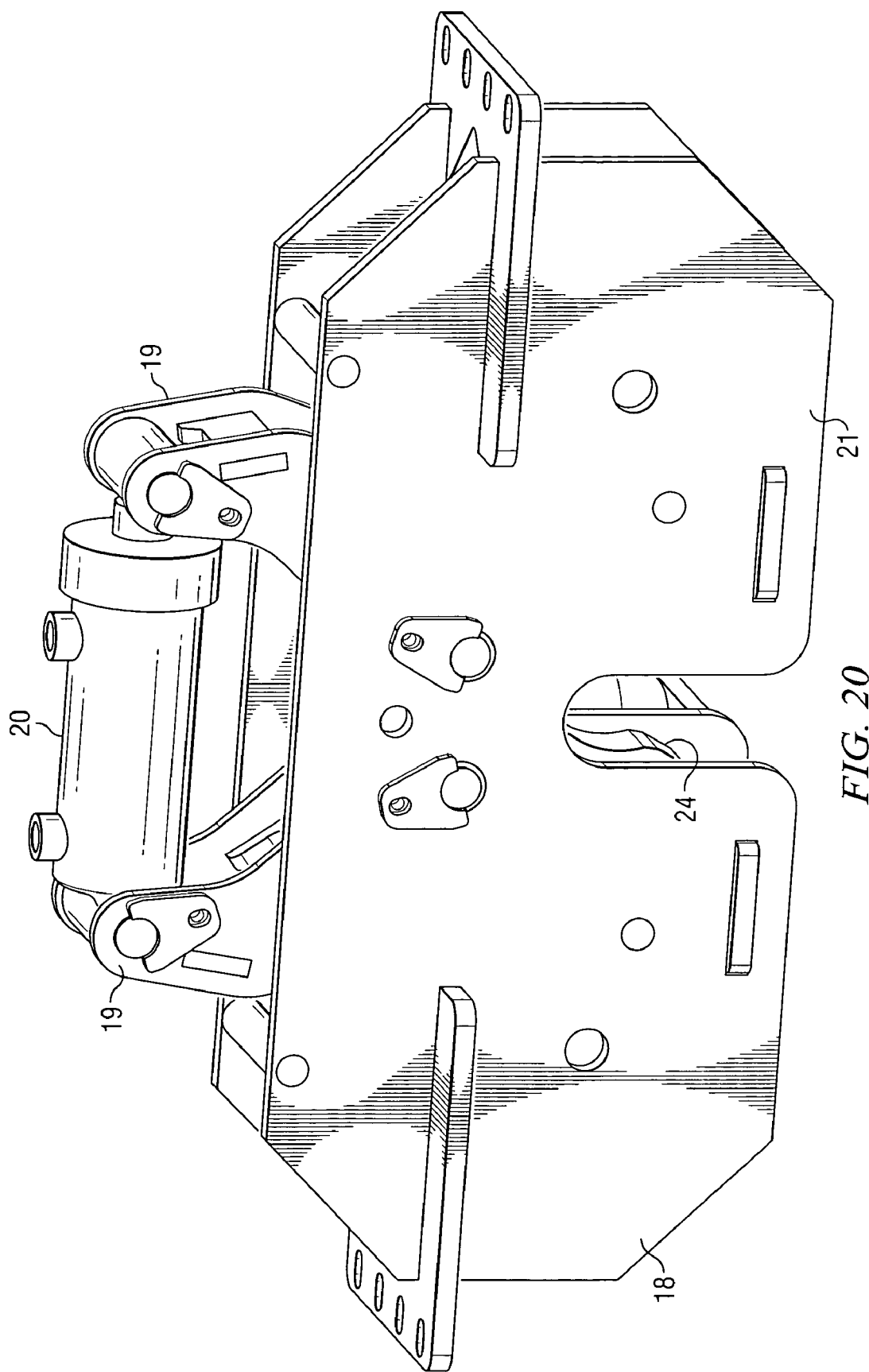
FIG. 20 is rear perspective view of the shear assembly of FIG. 19.

Referring to FIGS. 16–18 and 24–25, vise assembly 13 includes a pair of pivotal strand pulling arms 14 with serrated strand pulling jaws 28. Strand pulling arms 14 are actuated with a hydraulic cylinder 15 to cause strand pulling jaws 28 to engage and grasp pipe 11. As best shown in FIG. 16, a pair of hydraulic drive cylinders 16 mounted on frame 12 are coupled to vise assembly 13 for driving the vise assembly along tracks 17. Assembly 13 also includes a pair of vertical rollers 33 (FIG. 18) for guiding pipe 11 through apparatus 40.

When apparatus 40 has been positioned with strand 4 in slot 30, strand pulling cylinder 15 is actuated to pivot strand pulling jaw arms 14 about a pair pivot pins 31, causing jaws 28 to grasp pipe 11. Pins 31 also serve to removably secure arms 14 to vise frame 22. Jaws 28 engage pipe 11 with sufficient force to crush or crimp pipe 11 down onto strand 4, effectively uniting the pipe and strand for the purpose of pulling the pipe and strand from the soil. After jaws 28 have engaged pipe 11, drive cylinders 16 are actuated to push vise assembly 13 along tracks 17. Since jaws 28 have crushed pipe 11 onto strand 4, when cylinders 16 are activated, the pulling force is applied to both pipe 11 and strand 4 such that the pulling force is transmitted via strand 4 to upstream locations where pipe 11 has been crimped onto the strand. Thus, as vise assembly 13 moves along tracks 17 to the position illustrated in FIG. 14, it extracts pipe 11 and strand 4 from the ground.

Apparatus 40 also includes a shear assembly 18 for cutting sections of pipe 11 and strand 4 as the composite pipe/strand structure is pulled from the ground. Shear assembly 18 includes a shear frame 21 mounted in apparatus frame 12. Shear assembly 18 is not intended to move relative to track 17, therefore shear frame 21 is not equipped with track rollers. As illustrated in FIGS. 18–24, shear assembly 18 includes a pair of hydraulically actuated shear arms 19 which may have substantially the same construction and dimensions as strand pulling jaw arms 14. Shear arms 19 are pivotally mounted on pivot pins 32 such that actuation of shear cylinder 20 causes a pair of shear jaws 24 having shear edges 23 to close, cutting a portion or strand drop 25 (FIG. 15) from the end of pipe 11 and strand 4. Pins 32 also serve to removably secure arms 19 to shear frame 21. Shear assembly 18 also includes a pair of parallel vertical rollers 34 similar to rollers 33 for guiding pipe 11 through the assembly.

Figure 14:
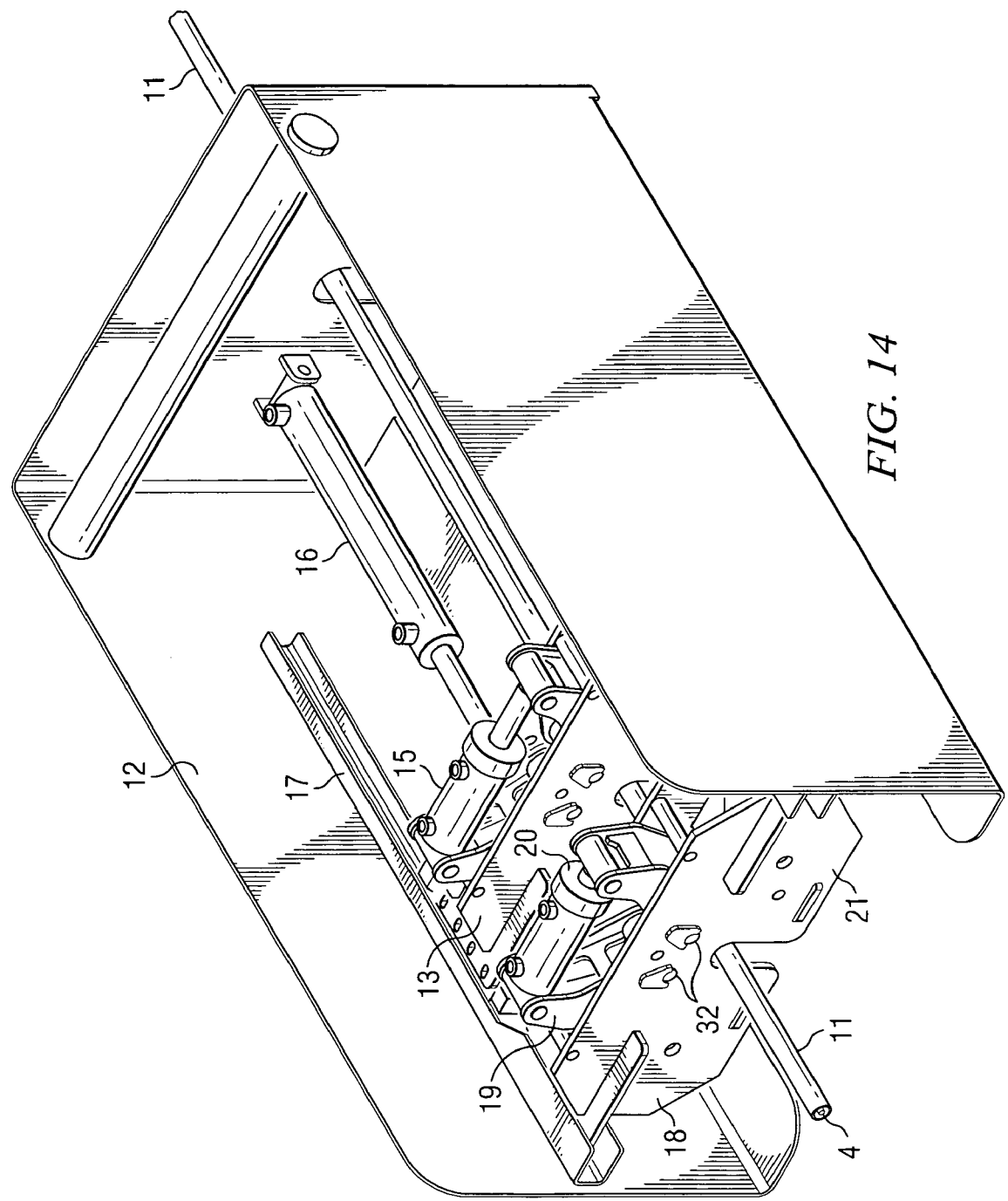
FIG. 14 is a perspective view of the strand pulling and shearing apparatus of FIG. 12 with the pulling vise assembly in a rearward position.
Figure 15:
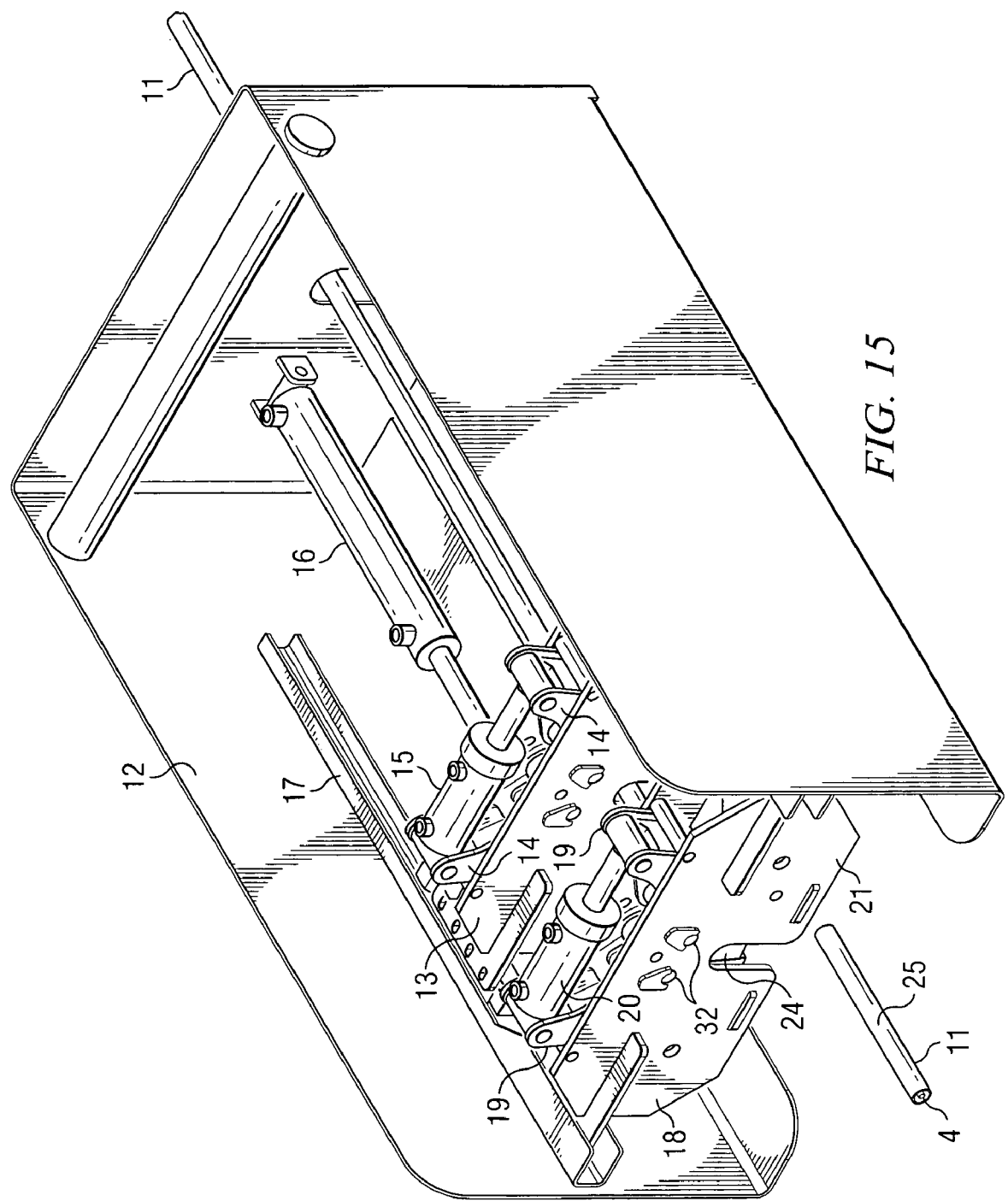
FIG. 15 is a perspective view of the strand pulling and shearing apparatus of FIG. 14 wherein the shear jaws have been closed to cut a segment of strand and pipe.
Figure 21:
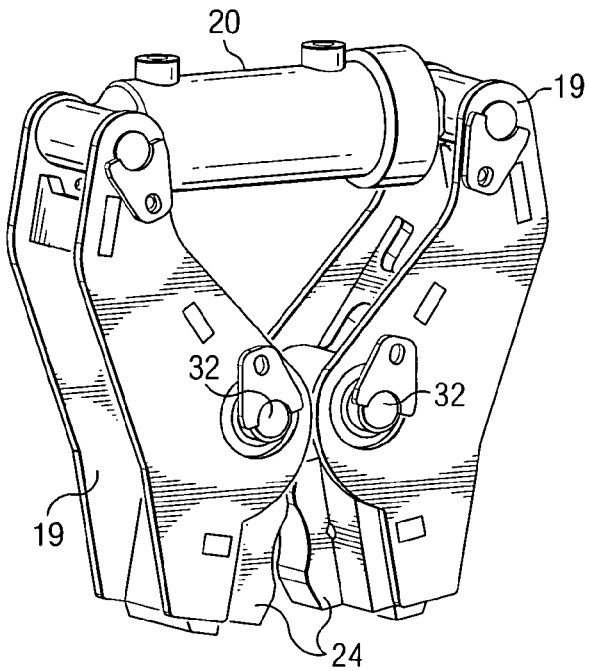
FIG. 21 is a partial perspective view of the shear jaw assembly of the shear assembly of FIGS. 19 and 20 with the jaws in the open position.
Figure 23:
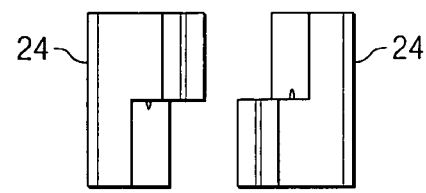
FIG. 23 is a top view of the shear jaws of the shear jaw assembly of FIGS. 21 and 22.
Figure 22:
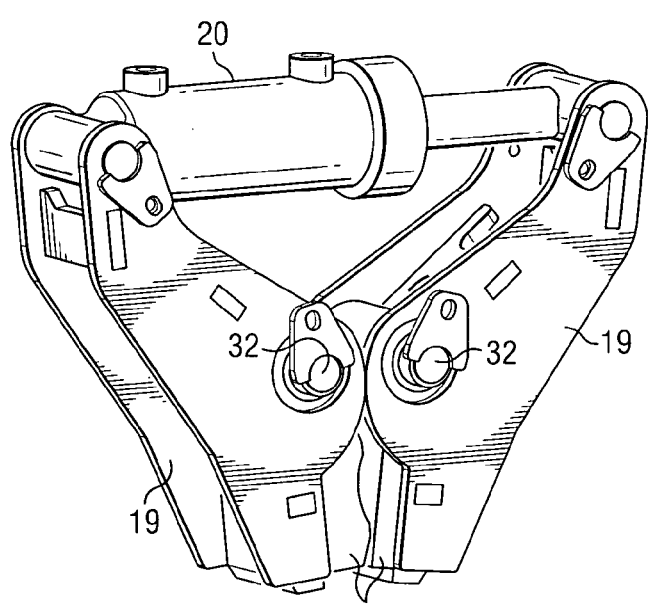
FIG. 22 is a partial perspective view of the shear jaw assembly of FIG. 21 with the shear jaws in a closed position.
Figure 24:
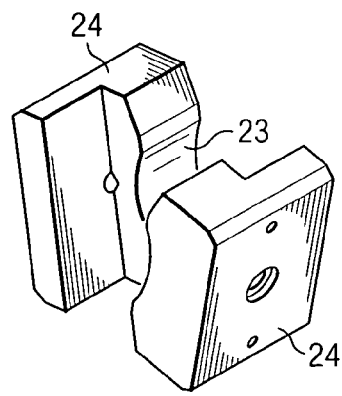
FIG. 24 is a perspective view of the shear jaws of FIG. 23.
Figure 25:
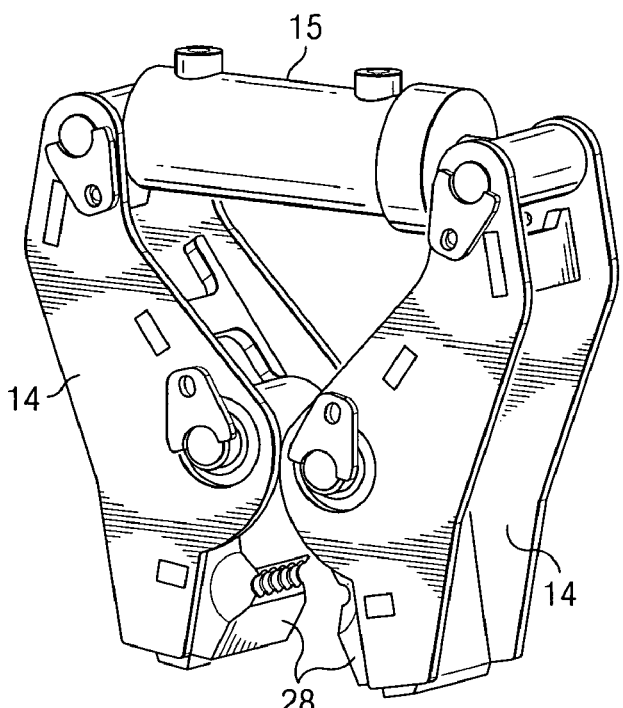
FIG. 25 is a partial perspective view of the vise jaw assembly of the vise assembly of FIGS. 18 and 19 with the vise jaws in the open position.
Figure 26:
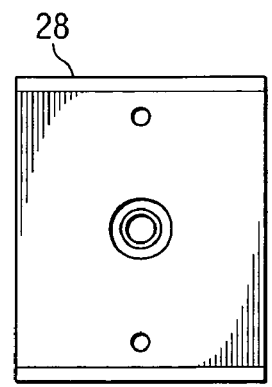
FIG. 26 is a back view of a gripping jaw of the vise jaw assembly of FIG. 25.
Figure 27:
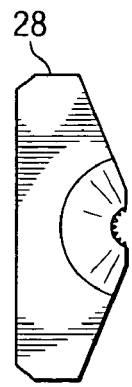
FIG. 27 is a top view of a gripping jaw of the vise jaw assembly of FIG. 25.
Figure 28:
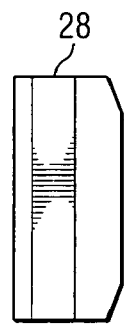
FIG. 28 is an end view of a gripping jaw of the vise jaw assembly of FIG. 25.
Figure 29:
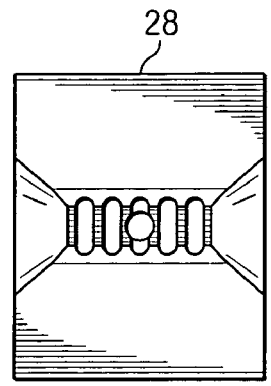
FIG. 29 is a front view of a gripping jaw of the vise jaw assembly of FIG. 25.

FIGS. 14 and 21 show shear assembly 18 prior to actuation with shear jaws 24 in the open position. FIGS. 15 and 22 illustrate the position of shear assembly 18 after actuation of cylinder 20 with shear jaws 24 closed. The pulling/shear cycle is repeated by retracting cylinders 15 and 20, thereby opening strand pulling jaws 28 and shear jaws 24, after which cylinders 16 are retracted, returning apparatus 40 to the start position shown in FIG. 12, after which the pulling/shearing cycle may be repeated.

Numerous variations of the method described above are possible. The method may for example be used to remove relatively small mains as well as laterals. Variations include the use of split external ferrules or band clamps to place over plastic host pipe so as to hold the integrity of the swaged joint, the use of welding to affix the pipe 11 to strand 4 as well as drilling holes in pipe 11 and using shear pins to affix the pipe to strand 4. It is also contemplated that a pneumatic tool, such as disclosed in U.S. patent application Ser. No. 946,081, filed Sep. 4, 2001 (Publication No. 20030044238) for "Method and Apparatus for Replacement of Underground Pipe," may be used in conjunction with the method, the contents of which are hereby incorporated by reference herein. With such a tool connected to the tool at the distal end of the composite structure formed by pipe 11 and strand 4, a large bore may be created as the pipe is extracted.

In another variation, surface texture might be applied to the strand either during the wire manufacturing process or by the drive rolls. The texture would enhance the joint between the pipe 11 and strand 4 at the swage location. Further, in the case of plastic pipe, something simple and economical like rope or electricians fish tape may be used as strand 4.

As an alternative to a solid wire strand, it has been found that a 1×7 ⅜" bridge rope, a wire rope used for guy wires and other permanent structure restraints, is suitable for use in the method of the invention. Bridge rope of this size has been found to be stiff enough for insertion in small diameter pipes, yet flexible enough to store in 2 ft. diameter coils. The bridge rope is readily cut with hydraulic shears, has a breaking strength of approximately 15,000 lbs, a weight of 0.30 lbs. per foot and does not require straightening between removal from a coil and insertion into a pipe.

Figure 30:
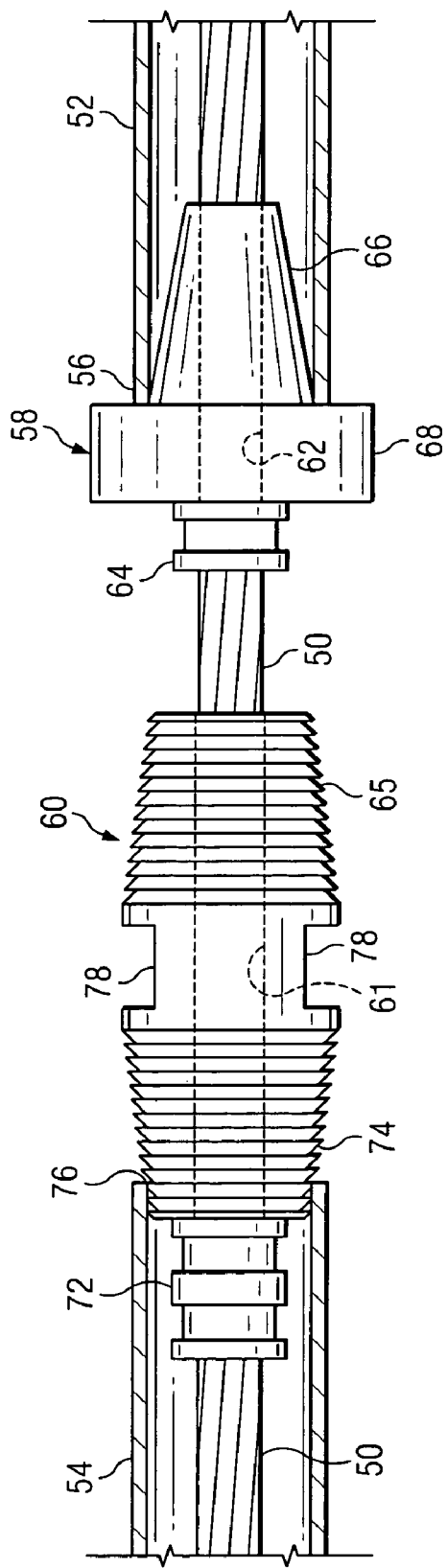
FIG. 30 is a side view of an alternative strand connection assembly according to the invention, partly in section.

FIG. 30 illustrates a strand connection utilizing a wire rope strand 50 to connect a pipe 52 to be replaced and a replacement pipe 54 to a pulling machine. Wire rope strand 50 is pushed though and out of a distal end 56 of pipe 52 with a sufficient length of the strand extending from pipe 52 to allow installation of an end cap 58 and a pipe pulling adapter 60 behind end cap 58 on the strand. Strand 50 is inserted through a central passage 62 of end cap 58. A compression stop sleeve 64 is crimped onto the strand behind cap 58 to prevent the cap from sliding backward on the strand during the pulling operation.

Figure 31:
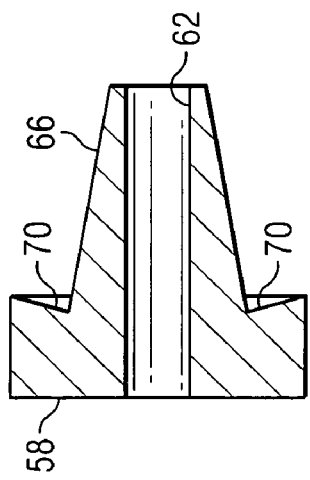
FIG. 31 is a sectional view of the hollow end cap of the connection assembly of FIG. 30.

A forwardly tapering, conical front end portion 66 of cap 58 centers the cap in pipe 52 as force is applied to the strand during the pulling operation. As illustrated in FIG. 31, cap 58 has a rear flange 68 with a diameter greater than that of pipe 52 and an inwardly sloped annular groove 70 outside of and behind conical front end portion 66 that abuts the distal end 56 of pipe 52 during the pulling operation. Groove 70 tends to hold and compress distal end 56 of pipe 52 inward during the pulling operation, thereby reducing the likelihood of distal end 56 of pipe 52 splitting or extruding over cap 58 during the pulling operation.

Strand 50 is passed through a center hole 61 in pipe puller 60, and a second stop sleeve 72 is crimped onto the strand 50 behind pipe puller 60. Pipe puller 60 is connected to replacement pipe 54, typically HDPE or copper, by screwing a tapered threaded read end 74 of the pipe puller into the open end 76 of replacement pipe 54. Pipe puller 60 includes flats 78 to allow the use of a wrench when connecting and disconnecting the puller to and from replacement pipe 54. In the embodiment shown, a front threaded end 65 is provided for convenience but not used. After puller 60 has been connected to replacement pipe 54, generally by tapping of the threads of rear end 74 into the inner periphery of the plastic replacement pipe, a winch or hydraulic pulling machine such as pulling and shearing apparatus 40 is positioned at a proximal end of pipe 52 to pull strand 50, pipe 52 and replacement pipe 54 through the ground.

Figure 32:
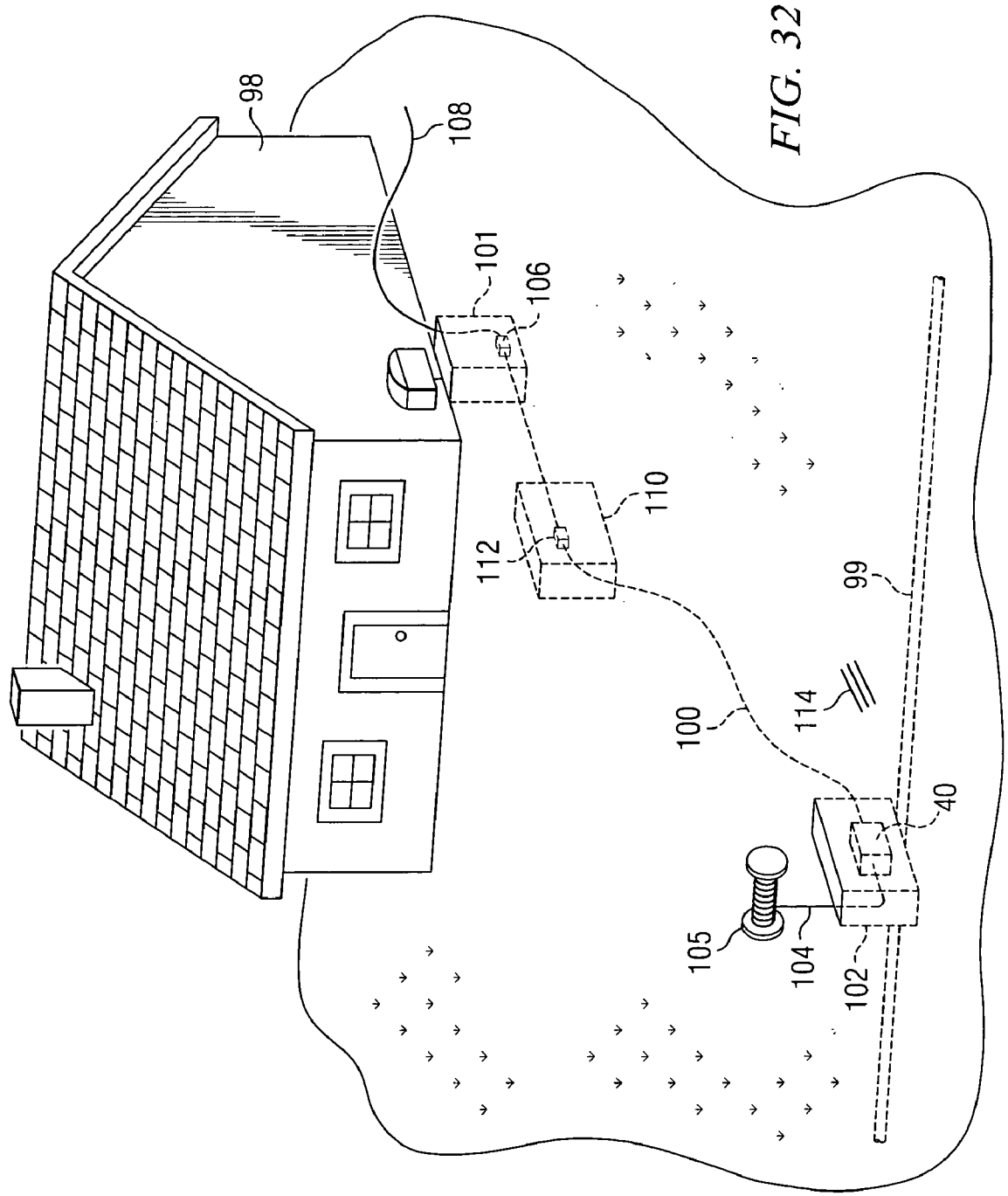
FIG. 32 is a schematic diagram of a pipe replacement operation in accordance with the invention.

Turning to FIG. 32, in accordance with the invention, a ductile lateral pipeline 100 to be replaced runs from a structure such as a residence 98 to a main 99 in the street. A method for replacement of an existing lateral pipeline 100 generally includes the steps of creating open access to opposite ends of pipe 100 to form a bore hole entry opening (entry pit) 101 and a bore hole exit opening (exit pit) 102.

For the replacement of laterals, entry pit 101 is preferably at the location where the lateral pipeline 100 enters the structure 98, and exit pit 102 is at the location the lateral connects to the main 99.

Pipe 100 is disconnected or cut in pits 101 and 102, and a strand 104 such as solid wire strand 4 or wire rope strand 50 is unwound from a reel 105 and threaded through the pipeline from exit pit 102 to entry pit 101. Pipe 100 is crimped or crushed onto strand 104 at 106 and connected to a replacement pipe 108 using, for example, a pipe puller and an eye 10 formed at the end of the strand to connect the strand to the pipe puller.

If strand 104 is a wire rope such as strand 50, after the strand is threaded through pipeline 100, the strand is preferably coupled to pipe 100 and to replacement pipe 108 using pipe pulling adapter 60 and end cap 58 as described in connection with FIGS. 30 and 31. In the case of longer pipe runs, it may be necessary to dig one or more additional pits 110 at intermediate locations along pipe 100 in order to crimp pipe 100 onto strand 104 at intermediate location 112. Depending upon the diameter of the pipe, soil conditions and other factors, it may be desirable to crimp pipe 100 onto strand 104 at intervals ranging from 50 to 75 feet. If the pipe run is short, i.e. 25 feet or less, especially 15 feet or less, and the soil surrounding the existing pipe is loose, then strand 104 need not be used, and the pipeline can be crimped and pulled from its proximal end.

After replacement pipe 108 has been connected to strand 104 and any desired intermediate crimping has been done, strand pulling and shearing apparatus 40 is placed into pit 102. Strand pulling and shearing apparatus 40 is used to pull and shear off successive sections 114 of pipe 100 and strand 104 as described in connection with FIGS. 12–16. Simultaneously, as pipe 100 is removed from the ground, replacement pipe 108 is pulled in behind pipe 100. After pipe 100 is completely removed and replacement pipe 108 has been pulled into exit pit 102, apparatus 40 is removed from the pit and replacement pipe 108 is connected at both ends to complete the replacement.

The invention disclosed here entails unique methods and apparatus. It is not the only method that can be used, however the efficiency potential that comes from a power driven reel inserting the strand offers economic potential. The ease of connecting the lateral to the main is also enhanced over a process where the host pipe (especially steel) is left in the ground. Slitting harder materials such as steel or copper may also leave a sharp edge on the host pipe that can cut plastic pipe as it is pulled in. Finally, it may be environmentally advantageous to remove from the ground host pipe that is made from lead.

The method of the invention largely eliminates the need for heavy equipment and extensive excavation, since in most cases only entry and exit pits of minimal size are required for the replacement operation. Other advantages, alterations and modifications of the invention will become apparent to those of ordinary skill in the art upon reading the present disclosure, and it is intended that the scope of the invention disclosed herein be limited only by the broadest interpretation of the appended claims.

The invention claimed is:

1. A method for the removal of a ductile pipe, comprising:
    passing a strand through the ductile pipe;
    crimping the ductile pipe at least in one location so that it is secured in a crimp about the strand; and
    pulling the strand from an end of the ductile pipe.

2. The method of claim 1, wherein the pipe is installed in the ground, and the crimp is drawn towards an exit opening.

3. The method of claim 2, wherein the pipe is made of HDPE.

4. The method of claim 2, wherein the pipe is made of steel.

5. The method of claim 2, further comprising crimping the ductile pipe at least two spaced locations along the ductile pipe.

6. The method of claim 2, further comprising pulling a replacement pipe in behind the ductile pipe.

7. A method for the removal of a ductile pipe, comprising:
passing a strand through the ductile pipe;
crimping the ductile pipe to the strand at its proximal end to form a crimp;
securing the ductile pipe to the strand at at least one location along the length of the pipe spaced from the crimp;
grasping the crimp with a pulling machine; and
then pulling the pipe and strand by the crimp with the pulling machine.

8. The method of claim 7, wherein the step of securing the ductile pipe to the strand comprises crimping the pipe to the strand at a location proximate a distal end of the pipe.

9. The method of claim 7, wherein the step of securing the ductile pipe to the strand comprises engaging a distal end of the pipe with a pulling device that is secured to the strand.

10. The method of claim 9, wherein the pulling device comprises an end cap mounted on the strand and a stop secured to the strand which clamps the end cap against the distal end of the pipe in response to pulling on the strand by the pulling machine.

11. The method of claim 9, wherein the pulling device comprises a crosspiece that engages the distal end of the pipe in response to pulling on the strand by the pulling machine.

12. The method of claim 9, wherein the pulling device comprises a widened portion of the strand that engages the distal end of the pipe in response to pulling on the strand by the pulling machine.

13. The method of claim 12, wherein the strand comprises a wire rope comprising braided wires, and the widened portion comprises an insert disposed inside the braided wires.

14. The method of claim 9, wherein the strand comprises a single wire.

15. The method of claim 9, wherein the strand comprises a wire rope.

16. The method of claim 7, wherein the pulling machine comprises a vise movable along a frame and a power cylinder for moving the vise along the frame, further comprising:
(a) closing the vise at a forward position on the frame to form the crimp;
(b) operating the cylinder to move the vise to a rearward position on the frame, thereby pulling the pipe and strand by the crimp;
(c) opening the vise to release the pipe;
(d) moving the vise to the forward position; and
(e) cyclically repeating steps (a) to (d) until the pipe has been removed.

17. The method of claim 16, wherein the pulling machine further comprises a cutter disposed proximate a front end of the frame, wherein step (b) further comprises cutting the pipe and strand when the vise is in its rearward position on the frame, and step (c) further comprises removing a resulting cut pipe and strand segment from the machine.

18. The method of claim 7, wherein the pipe is buried in the ground.

19. The method of claim 18, wherein the pipe is greater than 75 feet in length, and the pipe is secured to the strand at at least two locations along the length of the pipe spaced from the crimp at the proximal end, one of which locations is proximate the distal end of the pipe.

20. The method of claim 19, further comprising:
digging a pit at an intermediate location along the pipe thereby exposing the pipe; and
crimping the pipe to the strand at such intermediate location.

21. The method of claim 18, wherein the pipe is a lateral line extending from a structure to a main line, further comprising:
disconnecting the pipe from the main line and the structure;
positioning the pulling machine at a position proximate the main line, and
securing the ductile pipe to the strand at a location proximate the structure.

22. A strand pulling machine suitable for use in a method for the removal of a ductile pipe, comprising:
a frame including a track;
a vise movable along the frame including a pair of jaws configured to engage a ductile pipe having a strand extending therethrough and crimp the pipe to the strand;
a power cylinder connected to the frame and the vise for moving the vise along the track between frontward and rearward positions; and
a cutter disposed proximate a rear end of the frame having a pair of cutting jaws positioned to sever the pipe and strand upon actuation of the cutter.

23. The strand pulling machine of claim 22, wherein the power cylinder comprises a hydraulic cylinder.

24. The strand pulling machine of claim 22, wherein the tracks comprise a pair of spaced rails extending in a lengthwise direction of the frame, and the vise further comprises rollers attached to opposite sides of the frame for moving the vise along the rails.

25. The machine of claim 22, wherein the vise includes a vise frame, a pair of pivots by which the vise jaws are mounted to the vise frame such that pipe engaging surfaces of the jaws can be brought towards and away from one another by pivoting of the jaws on the pivots to thereby open and close the jaws, and a vise power cylinder connected to ends of the jaws on the opposite side of the pivots from the pipe engaging surfaces, whereby actuation of the vise power cylinder opens and closes the jaws.

* * * * *